(12) United States Patent
Bao et al.

(10) Patent No.: US 11,537,798 B2
(45) Date of Patent: Dec. 27, 2022

(54) METHOD AND APPARATUS FOR GENERATING DIALOGUE MODEL

(71) Applicant: BEIJING BAIDU NETCOM SCIENCE AND TECHNOLOGY CO., LTD., Beijing (CN)

(72) Inventors: Siqi Bao, Beijing (CN); Huang He, Beijing (CN); Junkun Chen, Beijing (CN); Fan Wang, Beijing (CN); Hua Wu, Beijing (CN); Jingzhou He, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 227 days.

(21) Appl. No.: 16/895,297

(22) Filed: Jun. 8, 2020

(65) Prior Publication Data
US 2021/0200957 A1  Jul. 1, 2021

(30) Foreign Application Priority Data
Dec. 27, 2019 (CN) .......................... 201911372144.9

(51) Int. Cl.
*G06F 40/30* (2020.01)
*G06F 16/332* (2019.01)

(52) U.S. Cl.
CPC .................................. *G06F 40/30* (2020.01)

(58) Field of Classification Search
CPC ........ G06F 40/30; G06F 40/35; G06F 40/289; G06F 16/3329; G06F 16/332;
(Continued)

(56) References Cited

U.S. PATENT DOCUMENTS 8,762,156 B2 * 6/2014 Chen ..................... G10L 15/183
704/265

FOREIGN PATENT DOCUMENTS

CN  108256066 A  7/2018
CN  108681610 A  10/2018
(Continued)

OTHER PUBLICATIONS

Chaotao Chen et al.; "Generating Multiple Diverse Responses with Multi-Mapping and Posterior Mapping Selection" Proceedings of the Twenty-Eighth International Joint Conference on Artificial Intelligence (IJCAI-19), Aug. 20, 2019, pp. 4918-4924 (7 pages).
(Continued)

*Primary Examiner* — Leshui Zhang
(74) *Attorney, Agent, or Firm* — Nixon Peabody LLP

(57) ABSTRACT

Embodiments of the present disclosure relate to a method and apparatus for generating a dialogue model. The method may include: acquiring a corpus sample set, a corpus sample including input information and target response information; classifying corpus samples in the corpus sample set, setting discrete hidden variables for the corpus samples based on a classification result to generate a training sample set, a training sample including the input information, the target response information, and a discrete hidden variable; and training a preset neural network using the training sample set to obtain the dialogue model, the dialogue model being used to represent a corresponding relationship between inputted input information and outputted target response information.

15 Claims, 5 Drawing Sheets

(58) Field of Classification Search
CPC .. G06F 16/3326; G06F 16/35; G06F 16/3344; G06F 16/355; G06N 3/0445; G06N 3/04; G06N 3/0454; G06N 3/08; G10L 15/26; G10L 15/063; G10L 15/22
USPC ........ 706/15–44, 60, 55; 704/1–10, E15.041
See application file for complete search history.

(56) References Cited

FOREIGN PATENT DOCUMENTS

| CN | 110275939 A | * | 9/2019 | ......... G06F 16/3329 |
| JP | 2019036093 A | | 3/2019 | |
| JP | 2020-030403 A | | 2/2020 | |

OTHER PUBLICATIONS

Siqi Bao et al.; "PLATO: Pre-trained Dialogue Generation Model with Discrete Latent Variable"; arXiv:1910:07931v2 [cs.CL]; Nov. 7, 2019 (12 pages)

* cited by examiner

METHOD AND APPARATUS FOR GENERATING DIALOGUE MODEL

CROSS-REFERENCE TO RELATED APPLICATIONS

This application claims priority to Chinese Application No. 201911372144.9, filed on Dec. 27, 2019 and entitled "Method and Apparatus for Generating Dialogue Model," the entire disclosure of which is hereby incorporated by reference.

TECHNICAL FIELD

Embodiments of the present disclosure relate to the field of computer technology, and specifically to a method and apparatus for generating a dialogue model.

BACKGROUND

A dialogue model is generally applicable to a smart dialogue system, such as a chat system for user communication or a navigation robot. Specifically, for an input sent by a user (which may be text or voice, etc.), the dialogue model may perform internal operation on the input given by the user, determine a response to the input, and then use the response as a model output and feed back to the user. Generally, the dialogue model may use a sequence to sequence (abbreviation: seq2seq) model to implement the above dialogue function (that is, short text response function).

In related technologies, the dialogue model is based on large-scale pre-training, for example, BERT. A response content generated by this dialogue model is single and lacks information, so it is impossible to accurately respond to the input sent by the user.

SUMMARY

Embodiments of the present disclosure propose a method and apparatus for generating a dialogue model.

In a first aspect, an embodiment of the present disclosure provides a method for generating a dialogue model, the method including: acquiring a corpus sample set, a corpus sample including input information and target response information; classifying corpus samples in the corpus sample set, setting discrete hidden variables for the corpus samples based on a classification result to generate a training sample set, a training sample including the input information, the target response information, and a discrete hidden variable; and training a preset neural network using the training sample set to obtain the dialogue model, the dialogue model being used to represent a corresponding relationship between inputted input information and outputted target response information.

In some embodiments, the preset neural network is a conversion neural network, and the conversion neural network is a neural network supporting unidirectional encoding and bidirectional encoding of text information; the training the preset neural network using the training sample set to obtain the dialogue model, includes: for the training sample in the training sample set, using the input information and the discrete hidden variable in the training sample as input, using the target response information in the training sample as expected output, training the conversion neural network based on one-way attention mechanism using a preset loss function, and updating a parameter of the conversion neural network; and using the input information and the target response information in the training sample as input of the updated conversion neural network, using the discrete hidden variable in the training sample as expected output, and training the conversion neural network based on two-way attention mechanism using the loss function to obtain the dialogue model.

In some embodiments, the training the preset neural network using the training sample set to obtain the dialogue model, includes: converting the training sample into a text vector for the training sample in the training sample set; and inputting the text vector into the preset neural network for training to obtain the dialogue model.

In some embodiments, the loss function includes at least one of: a negative log likelihood loss function, a bag of words loss function, or a response selection loss function; wherein, the bag-of-word loss function is used to represent a degree of difference between a discrete hidden variable outputted by the conversion neural network and the discrete hidden variable in the training sample; and the response selection loss function is used to represent a degree of difference between target response information outputted by the conversion neural network and the target response information in the training sample.

In some embodiments, the converting the training sample into the text vector for the training sample in the training sample set, includes: performing word segmentation on the input information and the target response information in the training sample for the training sample in the training sample set; and converting the training sample into the text vector, based on role information, word type information, dialogue round information and position information of each of the segmented words in the training sample.

In a second aspect, an embodiment of the present disclosure provides an apparatus for generating a dialogue model, the apparatus including: an acquisition unit, configured to acquire a corpus sample set, a corpus sample including input information and target response information; a generation unit, configured to classify corpus samples in the corpus sample set, set discrete hidden variables for the corpus samples based on a classification result to generate a training sample set, a training sample including the input information, the target response information, and a discrete hidden variable; and a training unit, configured to train a preset neural network using the training sample set to obtain the dialogue model, the dialogue model being used to represent a corresponding relationship between inputted input information and outputted target response information.

In some embodiments, the preset neural network is a conversion neural network, and the conversion neural network is a neural network supporting unidirectional encoding and bidirectional encoding of text information; the training unit is further configured to: for the training sample in the training sample set, use the input information and the discrete hidden variable in the training sample as input, use the target response information in the training sample as expected output, train the conversion neural network based on one-way attention mechanism using a preset loss function, and update a parameter of the conversion neural network; and use the input information and the target response information in the training sample as input of the updated conversion neural network, use the discrete hidden variable in the training sample as expected output, and train the conversion neural network based on two-way attention mechanism using the loss function to obtain the dialogue model.

In some embodiments, the training unit includes: a conversion module, configured to convert the training sample into a text vector for the training sample in the training sample set; and a training module, configured to input the text vector into the preset neural network for training to obtain the dialogue model.

In some embodiments, the loss function includes at least one of: a negative log likelihood loss function, a bag of words loss function, or a response selection loss function; wherein, the bag-of-word loss function is used to represent a degree of difference between a discrete hidden variable outputted by the conversion neural network and the discrete hidden variable in the training sample; and the response selection loss function is used to represent a degree of difference between target response information outputted by the conversion neural network and the target response information in the training sample.

In some embodiments, the conversion module is further configured to: perform word segmentation on the input information and the target response information in the training sample for the training sample in the training sample set; and convert the training sample into the text vector, based on role information, word type information, dialogue round information and position information of each of the segmented words in the training sample.

The method and apparatus for generating a dialogue model provided by embodiments of the present disclosure, acquires a corpus sample set; then classifies corpus samples in the corpus sample set, sets discrete hidden variables for the corpus samples based on a classification result to generate a training sample set including the input information, the target response information, and a discrete hidden variable; and finally trains a preset neural network using the training sample set to obtain the dialogue model. The method for generating a dialogue model provided by the present disclosure may determine the discrete hidden variables of the corpus samples, effectively model the "one-to-many" relationship between dialogue texts by introducing the discrete hidden variables, which improves the diversity of generated dialogue model responses, and thus can effectively respond to the input given by the user.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
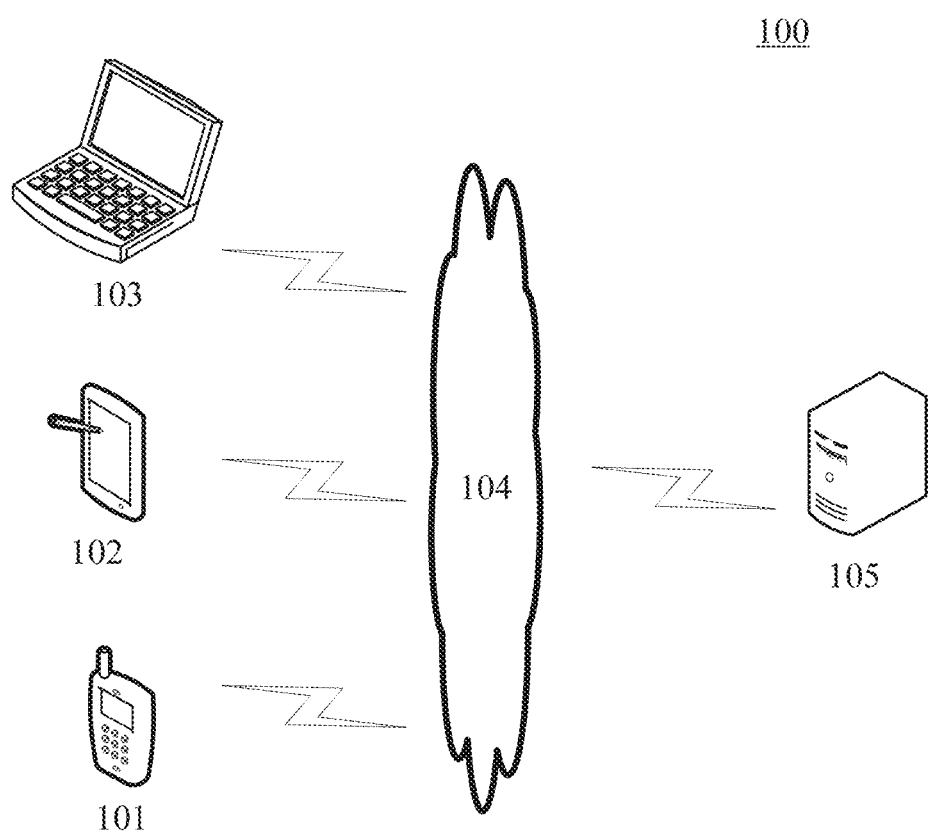
FIG. 1 is a diagram of an example system architecture in which some embodiments of the present disclosure may be implemented.

FIG. 1 illustrates an example system architecture 100 in which a method for generating a dialogue model or an apparatus for generating a dialogue model of an embodiment of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optic fibers.

A user may interact with the server 105 through the network 104 using the terminal devices 101, 102, 103, to receive or send messages or the like. Various communication client applications, such as web browser applications, shopping applications, search applications, instant messaging tools, email clients, or social platform software, may be installed on the terminal devices 101, 102, and 103.

The terminal devices 101, 102, and 103 may be hardware or software. When the terminal devices 101, 102, and 103 are hardware, the terminal devices 101, 102, and 103 may be various electronic devices having a display screen and are installed and used by applications such as smart dialogue systems, including but not limited to smart phones, tablet computers, E-book readers, laptop portable computers, desktop computers, or the like. When the terminal devices 101, 102, and 103 are software, the terminal devices 101, 102, and 103 may be installed in the electronic devices listed above. The terminal devices 101, 102, and 103 may be implemented as, for example, a plurality of software or software modules used to provide distributed services, or as a single software or software module, which is not specifically limited herein.

The server 105 may be a server that provides various services, such as a backend server that supports data displayed on the terminal devices 101, 102, and 103. The backend server may perform analysis and other processing on an acquired corpus sample set and other data, and generate a processing result (for example, a dialogue model).

It should be noted that the method for generating a dialogue model provided by embodiments of the present disclosure may be executed by the terminal devices 101, 102, 103, or may be executed by the server 105. Correspondingly, the apparatus for generating a dialogue model may be provided in the terminal devices 101, 102, 103, or may be provided in the server 105, which is not specifically limited herein.

It should be noted that the server may be hardware or software. When the server is hardware, the server may be implemented as a distributed server cluster composed of a plurality of servers, or may be implemented as a single server. When the server is software, the server may be implemented as a plurality of software or software modules (for example, for providing distributed services), or as a single software or software module, which is not specifically limited herein.

It should be understood that the numbers of terminal devices, networks, and servers in FIG. 1 are merely illustrative. Depending on the implementation needs, any number of terminal devices, networks, and servers may be provided.

Figure 2:
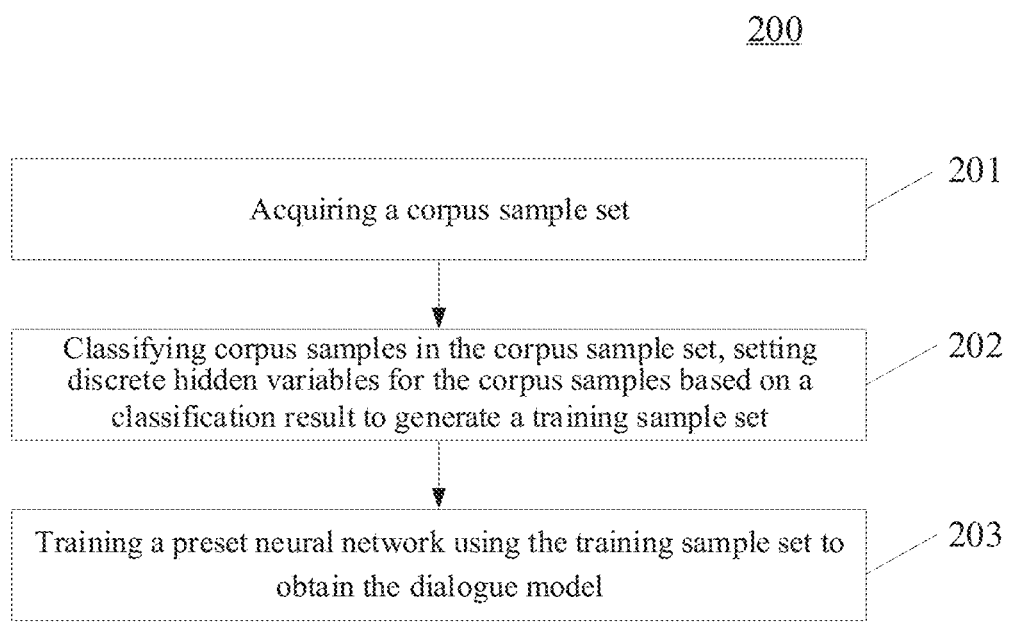
FIG. 2 is a flowchart of a method for generating a dialogue model according to an embodiment of the present disclosure.

With further reference to FIG. 2, a flow 200 of a method for generating a dialogue model according to an embodiment of the present disclosure is illustrated. The method for generating a dialogue model includes the following steps.

Step 201, acquiring a corpus sample set.

In the present embodiment, an executing body of the method for generating a dialogue model (for example, the server shown in FIG. 1) may acquire the corpus sample set. The corpus sample set may include a plurality of corpus samples, and each corpus sample may include input information and target response information. It should be noted that the corpus samples included in the above corpus sample set are dialogue corpus. For example, the input information of the corpus sample may be "Do you have a pet? I have a cute dog.", and the target response information may be "That is great." Alternatively, the corpus sample set may be a corpus sample set obtained from. Twitter corpus, Reddit corpus, or the like.

It should be noted that, the corpus sample set may be directly stored locally in the executing body, and in this case, the executing body may directly obtain the corpus sample set locally. In addition, the corpus sample set may also be sent to the executing body by other electronic devices connected to the executing body through a wired or wireless connection. The wireless connection may include, but not limited to, 3G/4G connection, WiFi connection, Bluetooth connection, WiMAX connection, Zigbee connection, UWB (ultra wideband) connection, or other wireless connection that is now known or to-be-developed in the future.

It may be understood that language models in related arts are generally trained using board texts (such as Wikipedia), and there is a large difference in the distribution of data and knowledge between a board text and a dialogue corpus. Therefore, compared with a corpus sample set obtained from Wikipedia, etc., the corpus sample set obtained from Twitter corpus, Reddit corpus, etc., including the input information and the target response information, is more suitable for training the dialogue model.

Step 202, classifying corpus samples in the corpus sample set, setting discrete hidden variables for the corpus samples based on a classification result to generate a training sample set.

In the present embodiment, based on the corpus sample set obtained in step 201, the executing body (for example, the server shown in FIG. 1) may classify the corpus samples in the corpus sample set into k categories according to the response direction of the target response information in the corpus sample set. Therefore, the discrete hidden variable may take a value from [1, k], and each value of the discrete hidden variables corresponds to a specific response direction of the target response information. Based on the classification result, the executing body may set the discrete hidden variables for the corpus samples. Thus, for each corpus sample, the executing body may generate a training sample that includes the input information and the target response information in the corpus sample, and a discrete hidden variable of the corpus sample. The executing body may use the corpus sample set to correspondingly generate the training sample set.

It may be understood that the discrete hidden variable of the corpus sample may correspond to the specific response direction in the corpus sample, thereby connecting the discrete hidden variable with the corpus sample set, making the discrete hidden variable interpretable, which helps to improve the accuracy of the generated dialogue model.

Step 203, training a preset neural network using the training sample set to obtain the dialogue model.

In the present embodiment, based on the training sample set generated in step 202, the executing body may train the preset neural network using the generated training sample set to obtain the dialogue model. The dialogue model may be used to represent a corresponding relationship between the inputted input information and the outputted target response information. For example, the executing body may train the dialogue model by: training the preset neural network using the input information and the target response information in the training sample as input, and using the discrete hidden variable as expected output, to obtain the dialogue model. The dialogue model obtained through training may accurately estimate the value of the discrete hidden variable, thereby helping to determine the direction of the response information outputted by the dialogue model and improving the reliability of the generated dialogue model.

In some alternative implementations of the present embodiment, the input information and the target response information in the corpus sample may be voice information or text information. If the input information and the target response information are voice information, the executing body may convert the voice information into text information in advance, and then use the text information for model training.

In the process of using the dialogue model, if the input information of the dialogue model is voice information, the voice information may be converted into text information, and the response information outputted by the dialogue model may be converted into voice information and outputted.

In some alternative implementations of the present embodiment, for the training sample in the training sample set, the executing body may convert the training sample into a text vector using various methods. Then, the executing body may input the text vector into the preset neural network for training to obtain the dialogue model. For example, the executing body may use a pre-trained vector space model to convert the training sample into the vector.

In some alternative implementations of the present embodiment, for the training sample in the training sample set, the executing body may obtain the text vector of the training sample by: for the training sample in the training sample set, performing word segmentation on the input information and the target response information in the training sample; and then converting the training sample into the text vector, based on role information, word type information, dialogue round information, and position information of each of the segmented words in the training sample. The training sample may include the input information, the target response information, and a discrete hidden variable. In order to distinguish sentences in the training sample, an identifier such as [EOS] may be added at the end of each sentence, and an identifier such as [BOS] may be added at the beginning of the sentence included in the target response information. For the discrete hidden variable z in the training sample, the discrete hidden variable embedding E, may be obtained by mapping from the hidden vector space. Further, in order to distinguish different dialogue roles in the training sample, role vector (role embedding) may be set based on role information of the training sample. Furthermore, for a plurality of rounds of interactive chat in the training sample, round vector (turn embedding) may be set in a relative order based on dialogue round information. For example, the turn embedding of the response is always $E_{[0]}$, the previous sentence is $E_{[-1]}$, and so on. The relative order of the dialogue rather than the absolute order is adopted here, so that the target response information may be prevented from being interfered by the dialogue round. Finally, in the training sample, position vector (position embedding) may be set based on position information of each word in each sentence. The text vector inputted to the preset neural network may be a superposition of the role embedding and other vectors correspondingly set by the role information, word type information, dialogue round information, and position information.

The method for generating a dialogue model provided by embodiments of the present disclosure, acquires a corpus sample set; then classifies corpus samples in the corpus sample set, sets discrete hidden variables for the corpus samples based on a classification result to generate a training sample set including the input information, the target response information, and a discrete hidden variable; and finally trains a preset neural network using the training sample set to obtain the dialogue model. The method for generating a dialogue model provided by the present disclosure may determine the discrete hidden variables of the corpus samples, effectively model the "one-to-many" relationship between dialogue texts by introducing the discrete hidden variables, which improves the diversity of generated dialogue model responses, and thus can effectively respond to the input given by the user.

Figure 3:
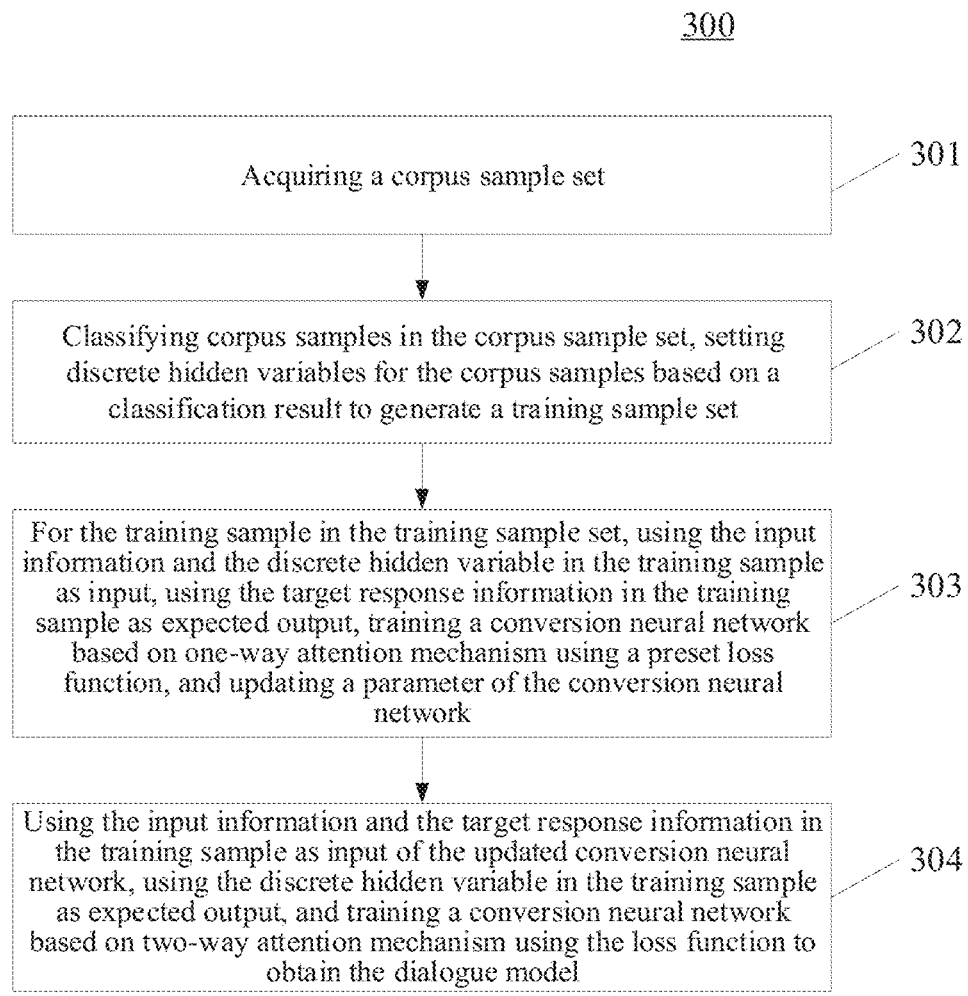
FIG. 3 is a flowchart of the method for generating a dialogue model according to another embodiment of the present disclosure.

With further reference to FIG. 3, a flow 300 of another embodiment of the method for generating a dialogue model is illustrated. The flow 300 of the method for generating a dialogue model includes the following steps.

Step 301, acquiring a corpus sample set.

In the present embodiment, an executing body of the method for generating a dialogue model (for example, the server shown in FIG. 1) may acquire the corpus sample set. The corpus sample set may include a plurality of corpus samples, and each corpus sample may include input information and target response information. It should be noted that the corpus samples included in the corpus sample set are dialogue corpus. For example, the corpus sample set may be obtained from Twitter corpus, Reddit corpus, or the like.

Step 302, classifying corpus samples in the corpus sample set, setting discrete hidden variables for the corpus samples based on a classification result to generate a training sample set.

In the present embodiment, based on the corpus sample set obtained in step 301, the executing body (for example, the server shown in FIG. 1) may classify the corpus samples in the corpus sample set into k categories according to the response direction of the target response information in the corpus sample set. Therefore, the discrete hidden variable may take a value from [1, k], and each value of the discrete hidden variables corresponds to a specific response direction of the target response information. Based on the classification result, the executing body may set the discrete hidden variables for the corpus samples. Thus, for each corpus sample, the executing body may generate a training sample that includes the input information and the target response information in the corpus sample, and a discrete hidden variable of the corpus sample. The executing body may use the corpus sample set to correspondingly generate the training sample set.

Step 303, for the training sample in the training sample set, using the input information and the discrete hidden variable in the training sample as input, using the target response information in the training sample as expected output, training a conversion neural network based on one-way attention mechanism using a preset loss function, and updating a parameter of the conversion neural network.

In the present embodiment, the preset neural network may be a conversion neural network, and the conversion neural network may be a neural network supporting unidirectional encoding and bidirectional encoding of text information. The conversion neural network may be a transformer network in UNILM (Unified Language Model Pre-training for Natural Language Understanding and Generation). The UNILM transformer network used in the present embodiment may flexibly support bidirectional encoding and unidirectional encoding, and may perform synchronous parallel training. The transformer network may encode input content during the training process. An encoder has an input self-attention layer, and output of this layer is fed into a feed-forward neural network, and a decoder decodes the outputted content. It should be noted that Transformer has the following characteristics: during the training process, each word in the input information flows through its own path when passing through the encoder, and there are dependency relationships between the paths in the self-attention layer, but a feed-forward layer does not have these dependency relationships, so various paths may be executed in parallel as they flow through the feed-forward layer. Alternatively, the conversion neural network may be other neural networks that support bidirectional encoding and unidirectional encoding, and may perform synchronous parallel training.

In the present embodiment, based on the training sample set obtained in step 302, for the training sample in the training sample set, the executing body may use the input information and the discrete hidden variable in the training sample as the input, use the target response information in the training sample as the expected output, train the conversion neural network based on the preset loss function, and update the parameter of the conversion neural network. In this step, the input information and the discrete hidden variable used as the input, and the target response information used as the expected output of the dialog model may train a response generation task of the dialogue model, so that the dialogue model may maximize the probability of the target response.

The above loss function may represent the degree of difference between the output of the model and the expected output. The smaller the loss function, the smaller the degree of difference between the output of the model and the expected output. Therefore, the goal of model training is to minimize the value of the loss function.

Step 304, using the input information and the target response information in the training sample as input of the updated conversion neural network, using the discrete hidden variable in the training sample as expected output, and training a conversion neural network based on two-way attention mechanism using the loss function to obtain the dialogue model.

In the present embodiment, based on the training sample set obtained in step 302, for the training sample in the training sample set, the executing body may use the input information and the target response information in the training sample as the input, use the discrete hidden variable in the training sample as the expected output, and train the updated conversion neural network based on the preset loss function, so that the parameter in the conversion neural network may be updated again. In this step, the input information and the target response information used as the input, and the discrete hidden variable used as the expected output of the dialog model may train a hidden action recognition task of the dialogue model, so that the dialogue model may estimate the discrete hidden variable, and accurate estimation of the discrete hidden variable may help to improve the quality of the response information outputted by the dialogue model.

In the present embodiment, for each training sample in the training sample set, the method in step 303 and step 304 may be used to train the dialogue model. The solution disclosed in embodiments of the present disclosure is to synchronously train the response generation task (corresponding to step 303) and the hidden action recognition task (corresponding to step 304) under the same network architecture and shared network parameters, so that the dialogue model obtained by training may maximize the probability of the target response and also determine the direction of response based on the accurately estimated discrete response variable, thereby improving the reliability of the dialogue model. Further, the UNILM transformer network used in the present embodiment supports bidirectional encoding and unidirectional encoding, so that bidirectional information of the input information and unidirectional information of the target response information may be fully utilized, and in the process of model training, the response generation task and the hidden action recognition task may be trained simultaneously.

In some alternative implementations of the present embodiment, the loss function may include at least one of: a negative log likelihood loss function, a bag of words loss function, or a response selection loss function. The negative log likelihood (NLL for short) loss function $L_{NLL}$ is a classic generation loss function. The NLL loss function may generally be used together with the softmax function. The bag-of-words (BOW) loss function $L_{BOW}$ may be used to represent the degree of difference between a discrete hidden variable outputted by the transformer network and the discrete hidden variable in the training sample. The BOW loss function is mainly used to facilitate the training of a discrete hidden variable. Compared with NLL, BOW does not consider word order information, so that the discrete hidden variable may grab global information in the response information. The response selection (RS) loss function $L_{RS}$ used to represent the degree of difference between target response information information outputted by the transformer network and the target response information in the training sample. The RS loss function is mainly used to determine whether the response information is related to the input information.

The above NLL loss function, BOW loss function and RS loss function may be as follows:

$$L_{NLL} = -\mathbb{E}_{z \sim p(z|c,r)} \log p(r|c,z) = -\mathbb{E}_{z \sim p(z|c,r)} \Sigma_{t=1}^{T} \log p(r|c,z,r_{<t}).$$

Here, z represents the discrete variable in the training sample, c represents the input information in the training sample, r represents the target response information in the training sample, T represents the number of vocabularies contained in the target response information r, t represents the sequence number of the current vocabulary in the vocabulary sequence of the target response information, and $r_{<t}$ represents the vocabulary sequence of the currently generated response information.

$$L_{BOW} = -\mathbb{E}_{z \sim p(z|c,r)} \sum_{t=1}^{T} \log p(r_t | c, z) = -\mathbb{E}_{z \sim p(z|c,r)} \sum_{t=1}^{T} \log \frac{e^{f_{r_t}}}{\Sigma_{v \in V} e^{f_v}}.$$

Here, the function $f$ is used to estimate the response probability of the vocabulary, V represents all the vocabularies in the entire dictionary, v represents the selected vocabulary, $f_v$ represents the estimated response probability of the vocabulary v, $f_{r_t}$ represents the estimated probability of the $t^{th}$ vocabulary in the response information r, and T represents the number of vocabularies contained in the target response information r.

$$L_{RS} = -\log p(l_r=1|c,r) - \log p(l_{r^-}=0|c,r^-).$$

Here, $r^-$ represents the target response information in the negative training sample (c, $r^-$), $l_r=1$ represents that the target response information is in the positive training sample, and $l_r=0$ represents that the target response is in the negative training sample.

In some alternative implementations of the present embodiment, the preset loss function L may be: $L=L_{NLL}+L_{BOW}+L_{RS}$. Using the loss function in this implementation for model training may improve the reliability of generating a dialogue model.

Figure 4:
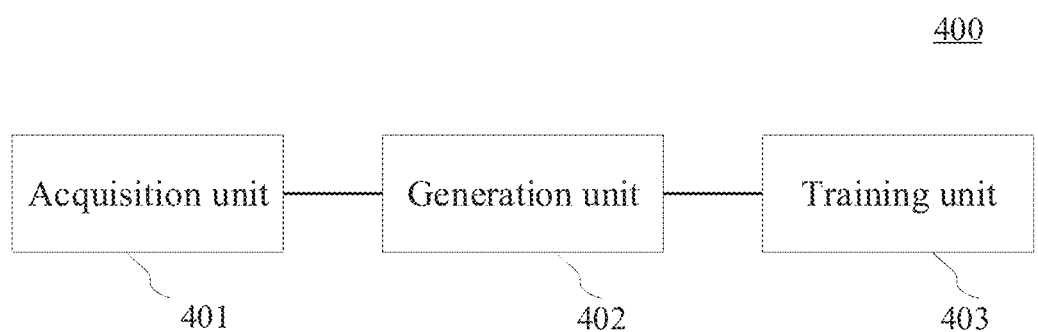
FIG. 4 is a schematic structural diagram of an apparatus for generating a dialogue model according to an embodiment of the present disclosure.

As can be seen from FIG. 4, compared with the embodiment corresponding to FIG. 2, the flow 400 of the method for generating a dialogue model in the present embodiment uses the input information and the discrete hidden variables as the input, use the target response information as the expected output to train the conversion neural network, and synchronously use the input information and the target response information as the input, the discrete hidden variable as the expected output to train the conversion neural network, realizing synchronous training of the response generation task and the hidden action recognition task, so that the dialogue model obtained by training may maximize the probability of the target response and also determine the direction of response based on the accurately estimated discrete response variable, thereby further improving the reliability of the dialogue model.

With further reference to FIG. 4, as an implementation of the method shown in the above figures, an embodiment of the present disclosure provides an apparatus for generating a dialogue model, and the apparatus embodiment corresponds to the method embodiment as shown in FIG. 2. The apparatus may be specifically applied to various electronic devices.

As shown in FIG. 4, an apparatus 400 for generating a dialogue model of the present embodiment includes: an acquisition unit 401, a generation unit 402, and a training unit 403. The acquisition unit 401 is configured to acquire a corpus sample set, a corpus sample including input information and target response information. The generation unit 402 is configured to classify corpus samples in the corpus sample set, set discrete hidden variables for the corpus samples based on a classification result to generate a training sample set, a training sample including the input information, the target response information, and a discrete hidden variable. The training unit 403 is configured to train a preset neural network using the training sample set to obtain the dialogue model, the dialogue model being used to represent a corresponding relationship between inputted input information and outputted target response information.

In the apparatus 400 for generating a dialogue model provided by the above embodiment of the present disclosure, the acquisition unit 401 acquires a corpus sample set, then the generation unit 402 classifies corpus samples in the corpus sample set, sets discrete hidden variables for the corpus samples based on a classification result to generate a training sample set including the input information, the target response information, and a discrete hidden variable, and finally the training unit 403 trains a transformer network using the training sample set to obtain the dialogue model. The apparatus for generating a dialogue model provided by the present disclosure may determine the discrete hidden variables of the corpus samples, effectively model the "one-to-many" relationship between dialogue texts by introducing the discrete hidden variables, which improves the diversity of generated dialogue model responses, and thus can effectively respond to the input given by the user.

In some alternative implementations of the present embodiment, the preset neural network is a conversion neural network, and the conversion neural network is a neural network supporting unidirectional encoding and bidirectional encoding of text information; the training unit 403 is further configured to: for the training sample in the training sample set, use the input information and the discrete hidden variable in the training sample as input, use the target response information in the training sample as expected output, train the conversion neural network based on one-way attention mechanism using a preset loss function, and update a parameter of the conversion neural network; and use the input information and the target response information in the training sample as input of the updated conversion neural network, use the discrete hidden variable in the training sample as expected output, and train the conversion neural network based on two-way attention mechanism using the loss function to obtain the dialogue model.

In some alternative implementations of the present embodiment, the training unit 403 includes: a conversion module, configured to convert the training sample into a text vector for the training sample in the training sample set; and a training module, configured to input the text vector into the preset neural network for training to obtain the dialogue model.

In some alternative implementations of the present embodiment, the loss function includes at least one of: a negative log likelihood loss function, a bag of words loss function, or a response selection loss function. The bag-of-word loss function is used to represent a degree of difference between a discrete hidden variable outputted by the conversion neural network and the discrete hidden variable in the training sample. The response selection loss function is used to represent a degree of difference between target response information outputted by the conversion neural network and the target response information in the training sample.

In some alternative implementations of the present embodiment, the conversion module is further configured to: perform word segmentation on the input information and the target response information in the training sample for the training sample in the training sample set; and convert the training sample into the text vector, based on role information, word type information, dialogue round information and position information of each of the segmented words in the training sample.

The units described in the apparatus 400 correspond to the various steps in the method described with reference to FIG. 2. Therefore, the operations and features described above for the method are also applicable to the apparatus 400 and the units included therein, and detailed description thereof will be omitted.

Figure 5:
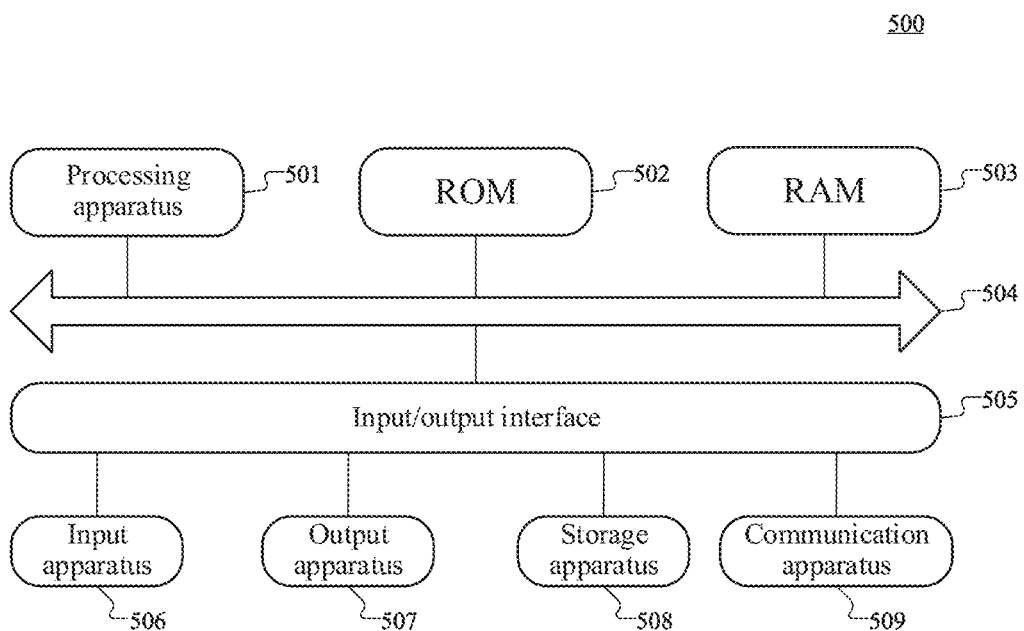
FIG. 5 is a schematic structural diagram of an electronic device adapted to implement embodiments of the present disclosure.

With further reference to FIG. 5, a schematic structural diagram of an electronic device (for example, the server in FIG. 1) 500 adapted to implement embodiments of the present disclosure is illustrated. The server shown in FIG. 5 is merely an example and should not impose any limitation on the function and scope of use of embodiments of the present disclosure.

As shown in FIG. 5, the electronic device 500 may include a processing apparatus (for example, a central processor, a graphics processor, etc.) 501, which may execute various appropriate actions and processes in accordance with a program stored in a read-only memory (ROM) 502 or a program loaded into a random access memory (RAM) 503 from a storage apparatus 508. The RAM 503 also stores various programs and data required by operations of the electronic device 500. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506, including such as a touch screen, a touch pad, a keyboard, a mouse, a camera, a microphone, an accelerometer, or a gyroscope; an output apparatus 507 including such as a liquid crystal display (LCD), a speaker, or a vibrator; the storage apparatus 508 including such as a magnetic tape, or a hard disk; and a communication apparatus 509. The communication apparatus 509 may allow the electronic device 500 to perform wireless or wired communication with other devices to exchange data. Although FIG. 5 shows the electronic device 500 having various apparatuses, it should be understood that it is not required to implement or have all the apparatuses shown. More or fewer apparatuses may be implemented or provided instead. Each block shown in FIG. 5 may represent one apparatus, and may also represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 509, or may be installed from the storage apparatus 508, or installed from the ROM 502. The computer program, when executed by the processing apparatus 501, implements the above mentioned functionalities as defined in the method of embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. Amore specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium not assembled into the electronic device. The computer readable medium carries one or more programs. The one or more programs, when executed by the electronic device, cause the electronic device to: acquire a corpus sample set, a corpus sample including input information and target response information; classify corpus samples in the corpus sample set, set discrete hidden variables for the corpus samples based on a classification result to generate a training sample set, a training sample including the input information, the target response information, and a discrete hidden variable; and train a preset neural network using the training sample set to obtain the dialogue model, the dialogue model being used to represent a corresponding relationship between inputted input information and outputted target response information.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor, for example, may be described as: a processor including an acquisition unit, a generation unit, and a training unit. Here, the names of these units do not in some cases constitute limitations to such units themselves. For example, the acquisition unit may also be described as "a unit configured to acquire a corpus sample set".

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating a dialogue model, the method comprising:
    acquiring a corpus sample set, a corpus sample comprising input information and target response information;
    classifying corpus samples in the corpus sample set, setting discrete hidden variables for the corpus samples based on a classification result to generate a training sample set, a training sample comprising the input information, the target response information, and a discrete hidden variable, wherein the corpus samples in the corpus sample set are classified according to a response direction of the target response information in the corpus sample set, and each value of the discrete hidden variables corresponds to a given response direction of the target response information; and
    training a preset neural network using the training sample set to obtain the dialogue model, the dialogue model being used to represent a corresponding relationship between inputted input information and outputted target response information.

2. The method according to claim 1, wherein the preset neural network is a conversion neural network, and the conversion neural network is a neural network supporting unidirectional encoding and bidirectional encoding of text information;
    the training the preset neural network using the training sample set to obtain the dialogue model, comprises:
    for the training sample in the training sample set, using the input information and the discrete hidden variable in the training sample as input, using the target response information in the training sample as expected output, training the conversion neural network based on one-way attention mechanism using a preset loss function, and updating a parameter of the conversion neural network to obtain an updated conversion neural network; and using the input information and the target response information in the training sample as input of the updated conversion neural network, using the discrete hidden variable in the training sample as expected output, and training the updated conversion neural network based on two-way attention mechanism using a loss function to obtain the dialogue model.

3. The method according to claim 2, wherein the loss function comprises at least one of: a negative log likelihood loss function, a bag of words loss function, or a response selection loss function;

wherein, the bag-of-word loss function is used to represent a degree of difference between a discrete hidden variable outputted by the conversion neural network and the discrete hidden variable in the training sample; and the response selection loss function is used to represent a degree of difference between target response information outputted by the conversion neural network and the target response information in the training sample.

4. The method according to claim 1, wherein the training the preset neural network using the training sample set to obtain the dialogue model, comprises:

converting the training sample into a text vector for the training sample in the training sample set; and inputting the text vector into the preset neural network for training to obtain the dialogue model.

5. The method according to claim 4, wherein the converting the training sample into the text vector for the training sample in the training sample set, comprises:

performing word segmentation on the input information and the target response information in the training sample for the training sample in the training sample set; and converting the training sample into the text vector, based on role information, word type information, dialogue round information and position information of each of the segmented words in the training sample.

6. An apparatus for generating a dialogue model, the apparatus comprising:

at least one processor; and a memory storing instructions, the instructions when executed by the at least one processor, causing the at least one processor to perform operations, the operations comprising:

acquiring a corpus sample set, a corpus sample comprising input information and target response information;

classifying corpus samples in the corpus sample set, set discrete hidden variables for the corpus samples based on a classification result to generate a training sample set, a training sample comprising the input information, the target response information, and a discrete hidden variable, wherein the corpus samples in the corpus sample set are classified according to a response direction of the target response information in the corpus sample set, and each value of the discrete hidden variables corresponds to a given response direction of the target response information; and training a preset neural network using the training sample set to obtain the dialogue model, the dialogue model being used to represent a corresponding relationship between inputted input information and outputted target response information.

7. The apparatus according to claim 6, wherein the preset neural network is a conversion neural network, and the conversion neural network is a neural network supporting unidirectional encoding and bidirectional encoding of text information;

the training the preset neural network using the training sample set to obtain the dialogue model, comprises:

for the training sample in the training sample set, using the input information and the discrete hidden variable in the training sample as input, using the target response information in the training sample as expected output, training the updated conversion neural network based on one-way attention mechanism using a preset loss function, and updating a parameter of the conversion neural network to obtain an updated conversion neural network; and using the input information and the target response information in the training sample as input of the updated conversion neural network, using the discrete hidden variable in the training sample as expected output, and training the conversion neural network based on two-way attention mechanism using a loss function to obtain the dialogue model.

8. The apparatus according to claim 7, wherein the loss function comprises at least one of: a negative log likelihood loss function, a bag of words loss function, or a response selection loss function;

wherein, the bag-of-word loss function is used to represent a degree of difference between a discrete hidden variable outputted by the conversion neural network and the discrete hidden variable in the training sample; and the response selection loss function is used to represent a degree of difference between target response information outputted by the conversion neural network and the target response information in the training sample.

9. The apparatus according to claim 6, wherein the training the preset neural network using the training sample set to obtain the dialogue model, comprises:

converting the training sample into a text vector for the training sample in the training sample set; and inputting the text vector into the preset neural network for training to obtain the dialogue model.

10. The apparatus according to claim 9, wherein the converting the training sample into the text vector for the training sample in the training sample set, comprises:

performing word segmentation on the input information and the target response information in the training sample for the training sample in the training sample set; and converting the training sample into the text vector, based on role information, word type information, dialogue round information and position information of each of the segmented words in the training sample.

11. A non-transitory computer readable medium, storing a computer program thereon, the program, when executed by a processor, causes the processor to perform operations, the operations comprising:

acquiring a corpus sample set, a corpus sample comprising input information and target response information;

classifying corpus samples in the corpus sample set, set discrete hidden variables for the corpus samples based on a classification result to generate a training sample set, a training sample comprising the input information, the target response information, and a discrete hidden variable, wherein the corpus samples in the corpus sample set are classified according to a response direction of the target response information in the corpus sample set, and each value of the discrete hidden variables corresponds to a given response direction of the target response information; and training a preset neural network using the training sample set to obtain a dialogue model, the dialogue model being used to represent a corresponding relationship between inputted input information and outputted target response information.

12. The non-transitory computer readable medium according to claim 11, wherein the preset neural network is a conversion neural network, and the conversion neural network is a neural network supporting unidirectional encoding and bidirectional encoding of text information;

the training the preset neural network using the training sample set to obtain the dialogue model, comprises:

for the training sample in the training sample set, using the input information and the discrete hidden variable in the training sample as input, using the target response information in the training sample as expected output, training the conversion neural network based on one-way attention mechanism using a preset loss function, and updating a parameter of the conversion neural network to obtain an updated conversion neural network; and using the input information and the target response information in the training sample as input of the updated conversion neural network, using the discrete hidden variable in the training sample as expected output, and training the updated conversion neural network based on two-way attention mechanism using a loss function to obtain the dialogue model.

13. The non-transitory computer readable medium according to claim 12, wherein the loss function comprises at least one of:

a negative log likelihood loss function, a bag of words loss function, or a response selection loss function;

wherein, the bag-of-word loss function is used to represent a degree of difference between a discrete hidden variable outputted by the conversion neural network and the discrete hidden variable in the training sample; and the response selection loss function is used to represent a degree of difference between target response information outputted by the conversion neural network and the target response information in the training sample.

14. The non-transitory computer readable medium according to claim 11, wherein the training the preset neural network using the training sample set to obtain the dialogue model, comprises:

converting the training sample into a text vector for the training sample in the training sample set; and inputting the text vector into the preset neural network for training to obtain the dialogue model.

15. The non-transitory computer readable medium according to claim 14, wherein the converting the training sample into the text vector for the training sample in the training sample set, comprises:

performing word segmentation on the input information and the target response information in the training sample for the training sample in the training sample set; and converting the training sample into the text vector, based on role information, word type information, dialogue round information and position information of each of the segmented words in the training sample.

* * * * *